UNITED STATES PATENT OFFICE 2,216,549

POLYMERIZATION OF UNSATURATED HYDROCARBONS

Richard M. Deanesly, Berkeley, Calif., assignor to Shell Development Company, San Francisco, Calif., a corporation of Delaware No Drawing. Application May 16, 1938,
Serial No. 208,233

3 Claims. (Cl. 196—10)

This invention deals with the catalytic polymerization of unsaturated hydrocarbons and is particularly concerned with an improvement in the polymerization of low boiling olefines having 3 to 5 carbon atoms.

It is a purpose of this invention to reduce the cost of polymerizing unsaturated hydrocarbons by prolonging the life of polymerization catalysts. Another object of the invention is to improve the uniformity of the polymerization reaction and to increase the capacity of the polymerizer by reducing variations in the activity of different portions of the same catalyst.

For purposes of clarity only, my invention will be described with particular reference to polymerizations carried out with phosphoric acid catalysts of the type described in United States Patent 1,993,513. The process of the invention is not limited to this type of polymerization catalyst, however, as it may be used with advantage where other catalysts are employed.

It is known that phosphoric acid, particularly when deposited on certain solid carriers, such as silicates or silica, is capable of effectively polymerizing olefines, especially those of 3 to 5 carbon atoms per molecule, at temperatures of about 300° F. to 400° F. to form dimers and trimers which upon hydrogenation yield high anti-knock gasolines of premium value. In the course of the polymerization the catalyst gradually loses its activity and it has been observed that the lives of different portions of the same catalyst often vary a great deal under seemingly identical conditions.

I have discovered that these variations are due largely to certain catalyst poisons which are often contained in the unsaturated hydrocarbons being polymerized, particularly in olefinic $C_3$, $C_4$ and $C_5$ fractions obtained from cracked distillates. I have further discovered that these poisons can be removed effectively by subjecting the hydrocarbons containing them to a water wash prior to contacting them with the polymerization catalyst.

For example, the distillate vapors of a California mineral oil cracked in a conventional Dubbs cracking unit were fractionally distilled to produce a narrow boiling $C_4$ fraction containing olefines. This fraction was passed at a temperature of 340° F. over a phosphoric acid catalyst consisting essentially of a granulated calcined mass of phosphoric acid deposited on silica. While the catalyst was fresh the conversion to higher boiling hydrocarbons was 37% of the feed. After 25 hours continuous operation the conversion had dropped to 34% and thereafter continued to drop steadily. A new batch of the same catalyst was then charged in place of the spent one and polymerization of the $C_4$ fraction from the same cracking stock obtained under identical conditions was resumed, the only difference being that a wash with 75 parts water per 100 parts of the fraction was interposed ahead of the polymerizer. The conversion with the fresh catalyst was again 37% and remained the same for 90 hours. During these comparative runs it was further observed that in the absence of a water wash the peak of the temperature in the catalyst bed had moved in 25 hours ⅓ of the length of the bed away from the point of entrance of the hydrocarbons, whereas when preceding the polymerization with the water wash, the peak temperature had moved only ⅙ of the length of the bed in 90 hours.

My investigation has revealed that the substances responsible for the catalyst poisoning are in particular lower amines and possibly aldehydes, all of which form azeotropes with hydrocarbons and therefore appear in distilled fractions in which they would not normally be expected. These amines and aldehydes although not substantially extractable by aqueous solutions of inorganic bases and salts, are readily extractable by water and can be washed out effectively therewith. Small amounts of sulfur compounds which are normally associated with the $C_3$ to $C_5$ fractions also may injure the activity of the phosphoric and similar acid catalysts. Careful analysis before and after washing the $C_4$ fraction from the California cracked distillate with 75% water has shown the following contents of impurities:

| Impurities | Before washing | After washing |
|---|---|---|
| Aldehydes | 310 mg./gal. | 90 mg./gal. |
| Amines | 21 mg./gal. | .4 mg./gal. |
| Sulfur | .002% | .0009%. |

Together with the impurities a small amount of olefines may be washed out from the hydrocarbon fraction, but this amount is too small to cause noticeable losses of polymers in the subsequent polymerization.

In order to determine whether the small amounts of nitrogen bases found above were responsible for the decline of the activity of the catalyst, a $C_4$ fraction from the same source was washed with water and an amount of low boiling petroleum nitrogen bases was added thereto to give it a content of about 300 mg. nitrogen bases per gallon of hydrocarbons. The fractions so treated were then polymerized over the same phosphoric acid catalyst under the usual conditions, and the life of the catalyst was found to decline at the exact rate found in the polymerization of the unwashed fraction.

The magnitude of the improvement in the catalyst life effected by the water wash depends upon the amount of nitrogen bases contained in the hydrocarbon fraction, the improvement being most pronounced where the content of nitrogen bases is greatest. In the case of $C_2$ to $C_5$ fractions obtained from certain California cracked distillates the average life of the phosphoric acid-on-silica-catalyst was from 60 to 90 gallons of polymer per pound of catalyst if no water wash was used, and 500 or more gallons per pound of catalyst if an efficient water wash was interposed as described.

Analysis of a rapidly deteriorated catalyst showed it to contain considerable amounts of ammonia and methyl amine, insufficient, however, to account for the decline in activity on the basis of neutralization of the phosphoric acid only. The effect of the nitrogen bases therefore seems to be more like that of a true catalyst poison.

The amounts of water required for washing vary somewhat with the content of the harmful impurities. In general, an amount of water from about ⅓ to 10 times the weight of the hydrocarbons is satisfactory, the exact amount usually depending on a balance between the value of the increased life of the catalyst and the cost of the wash.

During the washing the hydrocarbon fraction may be either in the liquid or vapor phase. A relatively low temperature, substantially below the boiling temperature of the water under the conditions of the wash, for example from about 15° to 30° C., is preferably maintained.

While I have described the beneficial effects of water washing $C_3$ to $C_5$ cracked hydrocarbon fractions on the life of phosphoric acid polymerization catalysts, this has been for illustrative purposes only. I have found that the lives of other phosphorus containing catalysts, such for example as polymerization catalysts comprising other acids of phosphorus and/or phosphorus pentoxide, etc., are similarly affected, altho in varying degrees. Still other polymerization catalysts which are subject to loss of activity thru contamination by components of the hydrocarbon mixtures undergoing treatment, may be improved in life and effectiveness, by prior water washing of the hydrocarbon. Thus, for example, the process of my invention may be applied to polymerizations carried out with sulfuric acid polymerization catalysts or with non-acid polymerization catalysts such as are described in British Patent 421,118, for example. When applying the water wash prior to polymerization with phosphoric pentoxide, the washed hydrocarbons should be dried before being contacted with the catalyst. With phosphoric and/or sulfuric acid polymerization catalysts, on the other hand, such drying is unnecessary as the use of hydrocarbons saturated with water at the temperature of washing is beneficial as an aid in preventing the loss of water from the catalyst and maintaining uniform activity. Furthermore, instead of the preferred olefinic $C_3$ to $C_5$ hydrocarbon fractions described in the foregoing examples and which include propane-propylene, butane-butylene and pentane-amylene fractions or mixtures of two or more such fractions with or without other hydrocarbons, still other olefinic hydrocarbons may be used.

It will thus be evident not only that the process of my invention has great practical advantages but also that it is capable of wide variation both with respect to the unsaturated hydrocarbons to which it may be applied and the catalysts which may be used. It will therefore be clear that the invention is not to be limited to the details of operation described nor by any theory advanced in explanation of the improved results attained, but only by the terms of the accompanying claims in which it is my intention to claim all novelty inherent therein as broadly as possible in view of the prior art.

I claim as my invention:

1. In the process of polymerizing an olefinic $C_3$ to $C_5$ hydrocarbon fraction containing impurities naturally associated therewith comprising amino bases, by contacting said fraction at a polymerization temperature with a phosphoric acid polymerization catalyst, the improvement comprising contacting said fraction containing said amino bases with a washing agent consisting of water in an amount of about ⅓ to 10 times the weight of said fraction prior to contacting it with the catalyst.

2. In the process of polymerizing an olefinic $C_3$ to $C_5$ hydrocarbon fraction containing impurities naturally associated therewith comprising amino bases, by contacting said fraction at a polymerization temperature with a sulfuric acid polymerization catalyst, the improvement comprising contacting said fraction containing said amino bases with a washing agent consisting of water in an amount of about ⅓ to 10 times the weight of said fraction prior to contacting it with the catalyst.

3. In the process of polymerizing an olefinic $C_3$ to $C_5$ hydrocarbon fraction containing impurities naturally associated therewith comprising amino bases, by contacting said fraction at a polymerization temperature with an inorganic acid polymerization catalyst, the improvement comprising contacting said fraction containing said amino bases with a washing agent consisting of water in an amount of about ⅓ to 10 times the weight of said fraction prior to contacting it with the catalyst.

RICHARD M. DEANESLY.